United States Patent
Hou et al.

(10) Patent No.: US 12,525,601 B2
(45) Date of Patent: Jan. 13, 2026

(54) BIPOLAR SOLID-STATE BATTERY WITH ENHANCED INTERFACIAL CONTACT

(71) Applicant: GM GLOBAL TECHNOLOGY OPERATIONS LLC, Detroit, MI (US)

(72) Inventors: Mengyan Hou, Shanghai (CN); Qili Su, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1060 days.

(21) Appl. No.: 17/550,507

(22) Filed: Dec. 14, 2021

(65) Prior Publication Data
US 2022/0263055 A1  Aug. 18, 2022

(30) Foreign Application Priority Data

Feb. 17, 2021 (CN) .......................... 202110186276.3

(51) Int. Cl.
*H01M 4/04* (2006.01)
*H01M 10/0565* (2010.01)
*H01M 10/0585* (2010.01)

(52) U.S. Cl.
CPC ..... *H01M 4/0433* (2013.01); *H01M 10/0565* (2013.01); *H01M 10/0585* (2013.01); *H01M 2300/0082* (2013.01)

(58) Field of Classification Search
CPC ........... H01M 4/0433; H01M 10/0565; H01M 4/0416; H01M 4/62; H01M 10/0585
See application file for complete search history.

(56) References Cited

U.S. PATENT DOCUMENTS 10,566,652 B2  2/2020  Dai et al.
10,714,756 B2  7/2020  Dai et al.
(Continued)

FOREIGN PATENT DOCUMENTS

CN  109411811 A  3/2019
CN  109659626 A  4/2019
(Continued)

OTHER PUBLICATIONS

First Office Action for Chinese Patent Application No. 202110186276.3 issued Mar. 10, 2025, with correspondence from China Patent Agent (H.K.) Ltd summarizing Office Action; 13 pages.
(Continued)

*Primary Examiner* — Sarah A. Slifka
(74) *Attorney, Agent, or Firm* — Harness, Dickey & Pierce, P.L.C.

(57) ABSTRACT

A method for forming a bipolar solid-state battery may include preparing a plurality of freestanding gels each comprising a polymer, a solvent, and a lithium salt and, also, positioning a first freestanding gel between a first electrode and a second electrode and a second freestanding gel between the second electrode and a third electrode. Each of the first electrode, the second electrode, and the third electrode may include a plurality of electroactive particles. The method may also include infiltrating at least a portion of the first free-standing gel into a space between particles of the first electrode and the second electrode and at least a portion of the second free-standing gel into a space between the particles of second electrode and the third electrode.

19 Claims, 11 Drawing Sheets

(56) References Cited

U.S. PATENT DOCUMENTS

| | | |
|---|---|---|
| 11,121,375 B2 | 9/2021 | Hou et al. |
| 11,145,922 B2 | 10/2021 | Li et al. |
| 11,942,620 B2 | 3/2024 | Lu et al. |
| 2015/0372298 A1 | 12/2015 | Fujieda et al. |
| 2020/0403267 A1 | 12/2020 | Li et al. |
| 2021/0020929 A1 | 1/2021 | Kong et al. |
| 2021/0028481 A1 | 1/2021 | Hou et al. |
| 2021/0036310 A1 | 2/2021 | Hou et al. |
| 2021/0036360 A1 | 2/2021 | Li et al. |
| 2021/0036373 A1 | 2/2021 | Li et al. |
| 2021/0050157 A1 | 2/2021 | Hou et al. |
| 2021/0050596 A1 | 2/2021 | Li et al. |
| 2021/0057776 A1 | 2/2021 | Lu et al. |
| 2021/0066746 A1 | 3/2021 | Hou et al. |
| 2021/0111426 A1 | 4/2021 | Li et al. |
| 2021/0135224 A1 | 5/2021 | Hou et al. |
| 2022/0102756 A1 | 3/2022 | Frieberg et al. |
| 2022/0123352 A1 | 4/2022 | Li et al. |
| 2022/0140422 A1 | 5/2022 | Chen et al. |
| 2022/0166031 A1 | 5/2022 | Li et al. |
| 2022/0181685 A1 | 6/2022 | Li et al. |

FOREIGN PATENT DOCUMENTS

| | | |
|---|---|---|
| CN | 109768334 A | 5/2019 |
| CN | 110518283 A | 11/2019 |
| CN | 111786012 A | 10/2020 |
| CN | 112103567 A | 12/2020 |
| CN | 114944509 A | 8/2022 |
| WO | 2014132320 A1 | 9/2014 |

OTHER PUBLICATIONS

Kim, Kun Joong et al.; "All Ceramic Cathode Composite Design and Manufacturing Towards Low Interfacial Resistance for Garnet-Based Solid-State Lithium Batteries"; published on Oct. 5, 2020; downloaded on Dec. 28, 2020; 16 pages.

Second Office Action for Chinese Patent Application No. 202110186276.3 issued Sep. 15, 2025, with correspondence from China Patent Agent (H.K.) Ltd summarizing Office Action; 14 pages.

BIPOLAR SOLID-STATE BATTERY WITH ENHANCED INTERFACIAL CONTACT

CROSS-REFERENCE TO RELATED APPLICATIONS

This application claims the benefit and priority of Chinese Application No. 202110186276.3, filed Feb. 17, 2021. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Many rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes.

The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte layer disposed between solid-state electrodes, the solid-state electrolyte layer physically separates the electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries generally experience comparatively low power capabilities. For example, such low power capabilities may be a result of interfacial resistance within the solid-state electrodes and/or at the electrode, and solid-state electrolyte layer interfacial resistance caused by limited contact, or void spaces, between the solid-state active particles and/or the solid-state electrolyte particles. Accordingly, it would be desirable to develop high-performance solid-state battery materials and methods that improve the contact and/or interaction between the solid-state active particles and/or the solid-state electrolyte particles, the contact and/or interaction between the solid-state electrodes and solid-state electrolyte layer, and/or mitigates the effects of the void spaces within the solid-state battery.

SUMMARY

This section provides a general summary of the disclosure, and is not a comprehensive disclosure of its full scope or all of its features.

The present disclosure relates to solid-state batteries, for example to bipolar solid-state batteries exhibiting enhanced interfacial contact, and to methods for forming bipolar solid-state batteries exhibiting enhanced interfacial contact using a free-standing gel.

For example, in one aspect, a method for forming a bipolar solid-state battery may include positioning a first freestanding gel between a first electrode and a second electrode and a second freestanding gel between the second electrode and a third electrode. Each of the plurality of freestanding gels includes a polymer, a solvent, and a lithium salt. Each of the first electrode, the second electrode, and the third electrode may include a plurality of electroactive particles. A first solid electrolyte layer including a first plurality of solid electrolyte particles may be disposed on the first electrode or on a first side of the second electrode. A second solid electrolyte layer including a second plurality of solid electrolyte particles may be disposed on a second side of the second electrode or on the third electrode. The method may also include infiltrating at least a portion of the first free-standing gel into a space between particles of the first electrode and the second electrode and at least a portion of the second free-standing gel into a space between the particles of second electrode and the third electrode.

In some aspects, the polymer may include a nitrile-based solid polymer electrolyte, a polyether, a polyester-based solid polymer, a polyvinylidene difluoride, a poly(vinylidene fluoride-co-hexafluoropropylene, and combinations and/or composites thereof.

In some aspects, the solvent may include ethylene carbonate, propylene carbonate, gamma-butyrolactone, tetraethyl phosphate, fluoroethylene carbonate, diethyl carbonate, ethyl methyl carbonate, ethylene sulfate, tetrahydrofuran or combinations thereof.

In some aspects, the lithium salt may include lithium bis-trifluoromethanesulfonimide (LiTFSI), lithium tetrafluoroborate (LiBF$_4$), lithium bis(oxalate)borate (LiBOB), lithium difluoro(oxalato) borate (LiODFB), lithium difluorophosphate (LiPO$_2$F$_2$), lithium fluoride (LiF) or the combinations of the mentioned salts.

In some aspects, the first electrode may include a third plurality of solid electrolyte particles mixed with the plurality of electroactive particles at the first electrode, the second electrode may include a fourth plurality of solid electrolyte particles mixed with the plurality of electroactive particles at the second electrode, and the third electrode may include a fifth plurality of solid electrolyte particles mixed with the plurality of electroactive particles at the third electrode. In some aspects, one or more of the first, second, third, fourth, or fifth plurality of solid electrolyte particles may include an oxide-based particle, a metal-doped or aliovalent-substituted oxide particle, a sulfide-based particle, a nitride-based particle, a hydride-based particle, a halide-based particle, a borate-based particle, an inactive oxide, or combinations thereof.

In some aspects, the first electrode may include a negative electrode having a first plurality of negative electroactive particles.

In some aspects, the second electrode may include a bipolar electrode, the first side having a first plurality of positive electroactive particles, and the second side having a second plurality of negative electroactive particles.

In some aspects, the third electrode may include a positive electrode having a second plurality of positive electroactive particles.

In some aspects, the first electrode may include the first solid electrolyte layer and the first free-standing gel may be positioned between the first solid electrolyte layer and the second electrode.

In some aspects, the first side of the second electrode may include the first solid electrolyte layer, and wherein the first free-standing gel may be positioned between the first solid electrolyte layer and the first electrode.

In some aspects, infiltrating at least a portion of the first free-standing gel and the second free-standing gel may include heating the first free-standing and the second free-standing gel to a temperature from about 40° C. to about 200° C. In some aspects, infiltrating at least a portion of the first free-standing gel and the second free-standing gel further includes applying pressure to press the first electrode, the second electrode, and the third electrode together. In some aspects, the pressure may be from about 0.1 MPa to about 200 MPa.

In some aspects, infiltrating at least a portion of the first free-standing gel and the second free-standing gel yields a gel disposed in the space between particles of the first electrode, the second electrode, and the third electrode.

In some aspects, the gel may exhibit ionic conductivity.

In some aspects, the methods may further include preparing a plurality of freestanding gels each comprising a polymer, a solvent, and a lithium salt. The preparing may further include mixing the polymer, the solvent, and the lithium salt to form a gel precursor solution, melting the gel precursor solution, and casting the gel precursor solution.

In some aspects, the first free-standing gel, the second free-standing gel, or both may have a thickness from 1 μm to about 200 μm.

In some aspects, the method may further include applying a polymer blocker to one or more of borders of the first electrode, the second electrode, or the third electrode. In some aspects, the polymer blocker may include a hot-melt adhesive, a polyethylene resin, a polypropylene resin, a resin containing an amorphous polypropylene resin as a main component and obtained by copolymerization with ethylene, propylene, and butylene, a silicone, a polyimide resin, an epoxy resin, an acrylic resin, a rubber, an isocyanate adhesive, an acrylic resin adhesive, a cyanoacrylate adhesive, or combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
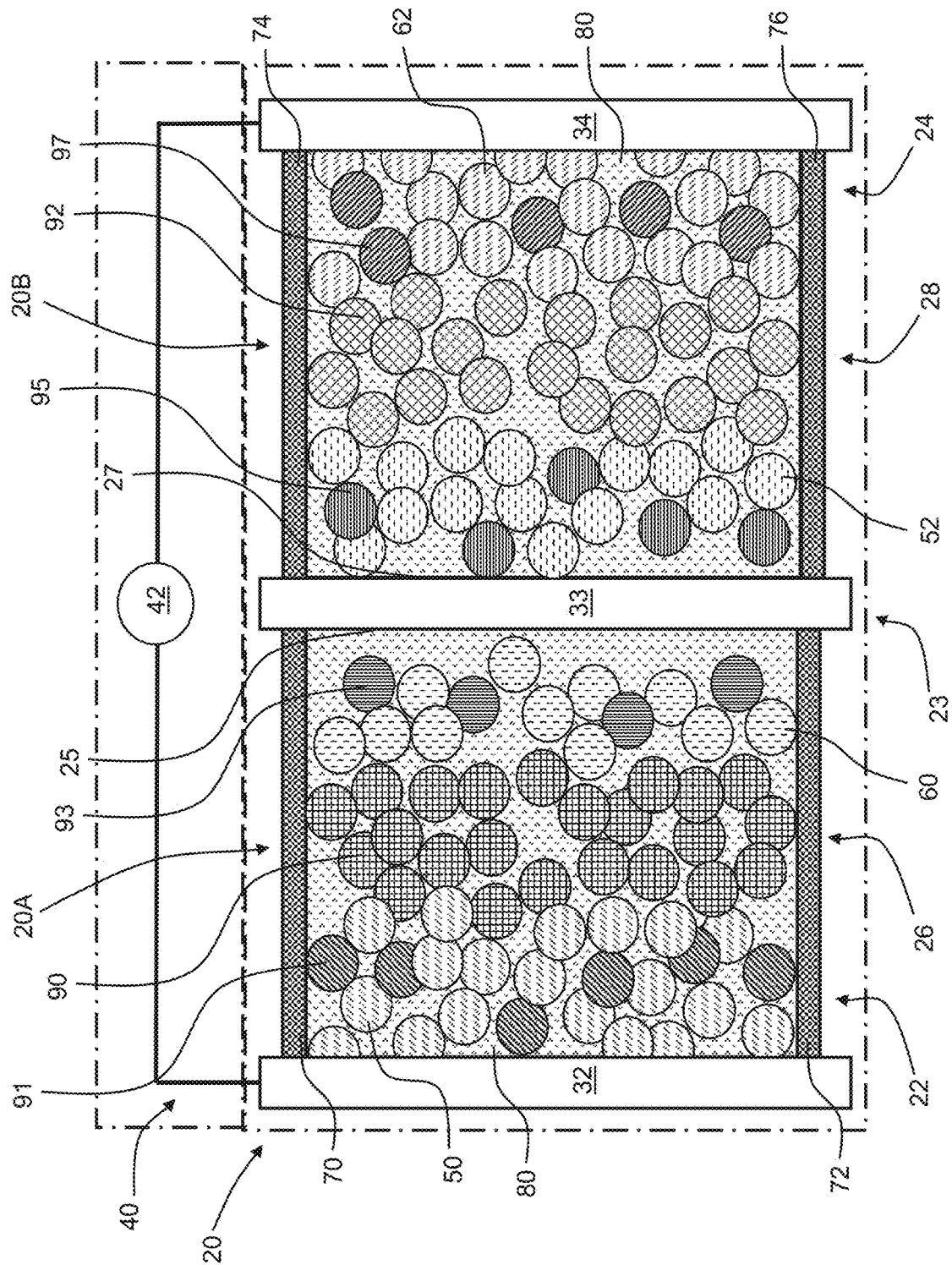
FIG. 1 is an illustration of an example bipolar solid-state battery.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current disclosure generally pertains to solid-state batteries (SSBs), for example, bipolar solid-state batteries exhibiting enhanced interfacial contact, and to methods for forming a bipolar SSB exhibiting enhanced interfacial contact by incorporating at least one free-standing gel component. Solid-state batteries may have a bipolar stacking design comprising a one or more bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of the current collector, which may be generally parallel with the first side of the current collector. The first mixture may include, as the solid-state electroactive material particles, positive electrode or cathode material particles and the second mixture may include, as solid-state electroactive material particles, negative electrode or anode material particles. The solid-state electrolyte particles in each instance may be the same or different.

An exemplary and schematic illustration of a solid-state electrochemical battery (also referred to as a "solid-state battery" and/or a "battery") 20 including a first cell 20A and a second cell 20B, that cycles lithium ions is shown in each of FIG. 1. The battery 20 includes a negative electrode (i.e., anode) 22, a bipolar electrode 23, a positive electrode (i.e., cathode) 24, a first solid-state electrolyte layer 26, and a second solid-state electrolyte layer 28.

The first solid-state electrolyte layer 26 and the second solid-state electrolyte layer 28 (collectively, the solid-state electrolyte layers 26, 28) are separating layers that physically separate each of the negative electrode (i.e., anode) 22 and the positive electrode (i.e., cathode) 24, respectively, from the bipolar electrode 23. The solid-state electrolyte layers 26, 28 may be defined by a first plurality of solid-state electrolyte particles 90 and a second plurality of solid-state electrolyte particles 92. In some aspects, a third plurality of solid-state electrolyte particles 91 may be mixed with a first plurality of negative solid-state electroactive particles 50 in the negative electrode 22 and a fourth plurality of solid-state electrolyte particles 93 may be mixed with a first plurality of positive solid-state electroactive particles 60 in the bipolar electrode 23 to, with the first solid-state electrolyte layer 26, form a continuous electrolyte network which may be a continuous or substantially continuous solid-state electrolyte network between the negative electrode 22 and the bipolar electrode 23. Also, a fifth plurality of solid-state electrolyte particles 95 may be mixed with a second plurality of negative solid-state electroactive particles 52 in the bipolar electrode 23 and a sixth plurality of solid-state electrolyte particles 97 may be mixed with a second plurality of positive solid-state electroactive particles 62 in the positive electrode 24 to, with the second solid-state electrolyte layer 28, form a continuous electrolyte network which may be a continuous or substantially continuous solid-state electrolyte network between the bipolar electrode 23 and the positive electrode 24. For example, the first and/or second negative solid-state electroactive particles 50, 52 and/or the first and/or second positive solid-state electroactive particles 60, 62 may be independently mixed with no electrolyte, or with the third, fourth, fifth, and sixth plurality of solid-state electrolyte particles 91, 93, 95, 97, respectively.

A negative electrode current collector 32 may be positioned at or near the negative electrode 22. The negative electrode current collector 32 may be formed from any suitable electrically conductive material known to those of skill in the art, for example, as discussed herein. A bipolar electrode current collector 33 may be positioned at or near the bipolar electrode 23. The bipolar electrode current collector 33 may be formed from any suitable electrically conductive material known to those of skill in the art, for example, as discussed herein. A positive electrode current collector 34 may be positioned at or near the positive electrode 24. The positive electrode current collector 34 may be formed from any suitable electrically conductive material known to those of skill in the art, for example, as discussed herein. The negative electrode current collector 32, the bipolar electrode current collector 33, and the positive electrode current collector 34, respectively, collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

Though the illustrated example includes a single positive electrode (i.e., cathode) 24 and a single negative electrode (i.e., anode) 22, the skilled artisan will recognize, upon viewing this disclosure, that the current teachings apply to various other configurations, including those having one or more cathodes and one or more anodes, as well as various current collectors with electroactive particle layers disposed on or adjacent to one or more surfaces thereof. Also, though the illustrated example includes a bipolar electrode 23, the skilled artisan will recognize that the current teachings apply to various other configurations, including those having multiple bipolar electrodes.

The battery 20 can generate an electric current during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the solid-state electrolyte layer 26 towards the bipolar electrode 23 from the bipolar electrode 23 toward the positive electrode 24. The electrons flow through the external circuit 40 and the lithium ions migrate across the first and second solid-state electrolyte layers 26, 28 toward the bipolar electrode 23 and the positive electrode 24, respectively, where they may be plated, reacted, or intercalated. The electric current passing through the external circuit 40 can be harnessed and directed through the load device 42 (in the direction of the arrows) until the lithium in the negative electrode 22 and the bipolar electrode is depleted and the capacity of the battery 20 is diminished.

While the battery 20 provided by the present technology is particularly suitable for use in components of an automobile or other vehicles (e.g., motorcycles, boats, tractors, buses, motorcycles, mobile homes, campers, and tanks), they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example.

The battery 20 can be charged or reenergized at any time by connecting an external power source (e.g., a charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the solid-state electrolyte layers 26, 28 back towards the negative electrode 22 and the bipolar electrode, respectively reunite at the negative electrode 22 and bipolar electrode, respectively, to replenish them with lithium for consumption during the next battery discharge cycle. As such, a complete discharging event followed by a complete charging event is considered to be a cycle, where lithium ions are cycled between the positive electrode 24 and the negative electrode 22.

In many the configurations of the battery 20, each of the negative electrode current collector 32, the negative electrode 22, the solid-state electrolyte layer 26, the bipolar electrode (including the biopolar current collector 33) the positive electrode 24, and the positive electrode current collector 34 are prepared as relatively thin layers (for example, from several microns to a millimeter or less in thickness) and assembled in layers connected in series arrangement to provide a suitable electrical energy, battery voltage and power package, for example, to yield a Series-connected Elementary Cell Core (SECC). In various other instances, the battery 20 may further include electrodes 22, 24 connected in parallel to provide suitable electrical energy, battery voltage, and power for example, to yield a Parallel-connected Elementary Cell Core (PECC).

In various aspects, the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, the bipolar electrode, and/or the solid-state electrolyte layers 26, 28.

As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. As noted above, the battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

The solid-state electrolyte layers 26, 28 provide electrical separation—for example, preventing physical contact—between the negative electrode 22 (i.e., an anode) and the bipolar electrode 23 and, likewise, between the bipolar electrode 23 and the positive electrode 24 (i.e., a cathode). The solid-state electrolyte layers 26, 28 also provide path of minimal resistance for internal passage of ions. In various aspects, as noted above, the solid-state electrolyte layers 26, 28 may be defined by a first plurality of solid-state electrolyte particles 90 and a second plurality of solid-state electrolyte particles 92, respectively. For example, the solid-state electrolyte layers 26, 28 may be in the form of a layer or a composite that includes the first and second plurality of solid-state electrolyte particles 90, 92. The solid-state electrolyte particles 90, 92 may have an average particle diameter greater than or equal to about 0.01 μm to less than or equal to about 10 μm, and in certain aspects, optionally greater than or equal to about 0.1 μm to less than or equal to about 5 μm. Though not illustrated, the skilled artisan will recognized that in certain instances, one or more binder particles may be mixed with the solid-state electrolyte particles 90, 92. For example, in certain aspects the solid-state electrolyte layers 26, 28 may include greater than or equal to about 0.5 wt. % to less than or equal to about 10 wt. % of the one or more binder. The one or more binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The solid-state electrolyte layers 26, 28 may be in the form of a layer having a thickness greater than or equal to about 2 μm to less than or equal to about 200 μm, optionally greater than or equal to about 10 μm to less than or equal to about 100 μm, optionally about 40 μm, and in certain aspects, optionally about 20 μm.

In various aspects, the first and second plurality of solid-state electrolyte particles 90, 92 may include one or more oxide-based particles, metal-doped or aliovalent-substituted oxide particles, sulfide-based particles, nitride-based particles, hydride-based particles, halide-based particles, borate-based particles, and inactive oxides.

In certain variations, the oxide-based particles may include one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where $0\leq x\leq 2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.52}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

In certain variations, the metal-doped or aliovalent-substituted oxide particles may include, for example only, titanium (Ti), tantalum (Ta), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof.

In certain variations, the sulfide-based particles may include, for example only, $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$(thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.5\leq x\leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, and combinations thereof.

In certain variations, the nitride-based particles may include, for example only, $Li_3N$, $Li_7PN_4$, $LiSi_2N_3$, and combinations thereof; the hydride-based particles may include, for example only, $LiBH_4$, $LiBH_4$—$LiX$ (where $x=Cl$, Br, or I), $LiNH_2$, $Li_2NH$, $LiBH_4$—$LiNH_2$, $Li_3AlH_6$, and combinations thereof; the halide-based particles may include, for example only, $LiI$, $Li_3InCl_6$, $Li_2CdC_{14}$, $Li_2MgCl_4$, $LiCdI_4$, $Li_2ZnI_4$, $Li_3OCl$, and combinations thereof; the borate-based particles may include, for example only, $Li_2B_4O_7$, $Li_2O$—$B_2O_3$—$P_2O_5$, and combinations thereof; and/or the inactive oxides may include, for example only, $SiO_2$, $Al_2O_3$, $TiO_2$, and $ZrO_2$.

For example, in various aspects, the solid-state electrolyte particles 90, 92 may include one or more electrolyte materials selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), $LiMM'(PO_4)_3$(where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), titanium (Ti), tantalum (Ta), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$(thio-LISICON), $Li_{10}SnP_2S_{12}$, $Li_{10}SiP_2S_{12}$, $Li_{9.54}Si_{1.74}P_{1.44}S_{11.7}Cl_{0.3}$, (1-x)$P_2S_5$-$xLi_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, $Li_3N$, $Li_7PN_4$, $LiSi_2N_3$, $LiBH_4$, $LiBH_4$—$LiX$ (where x=Cl, Br, or I), $LiNH_2$, $Li_2NH$, $LiBH_4$—$LiNH_2$, $Li_3AlH_6$, $LiI$, $Li_3InCl_6$, $Li_2CdC_{14}$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

The first and second pluralities of solid-state electrolyte particles may be independently selected. For example, the first plurality of solid-state electrolyte particles 90 may be the same as or different from the second plurality of solid-state electrolyte particles 92. Additionally, one or more of the materials and/or compositions disclosed with respect to the first and second pluralities of solid-state electrolyte particles 90, 92 may be employed in the context of the third, fourth, fifth, and/or sixth pluralities of solid-state electrolyte particles 91, 93, 95, 97, respectively, as will be discussed. In various aspects, the various pluralities of solid-state electrolyte particles may be independently selected. For example, in various aspects, two or more of the first, second, third, fourth, fifth, and/or sixth pluralities of solid-state electrolyte particles 90 92, 91, 93, 95, 97, respectively, may be the same or may be different.

The negative electrode 22 may be formed from a lithium host material that is capable of functioning as a negative terminal of a lithium-ion battery. For example, in certain variations, the negative electrode 22 may be defined by the first plurality of the negative solid-state electroactive particles 50. In certain instances, the negative electrode 22 is a composite comprising a mixture of the first plurality of negative solid-state electroactive particles 50 and the third plurality of solid-state electrolyte particles 91. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the first plurality of negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 91.

In certain variations, the first plurality of negative solid-state electroactive particles 50 may be lithium-based, for example, a lithium alloy. In other variations, the first plurality of negative solid-state electroactive particles 50 may be silicon-based comprising, for example, a silicon alloy and/or silicon-graphite mixture. In still other variations, the negative electrode 22 may be a carbonaceous anode and the first plurality of negative solid-state electroactive particles 50 may include one or more negative electroactive materials, such as graphite, graphene, hard carbon, soft carbon, and carbon nanotubes (CNTs). In still further variations, the negative electrode 22 may include one or more negative electroactive materials, such as lithium titanium oxide ($Li_4Ti_5O_2$); one or more metal oxides, such as $TiO_2$ and/or $V_2O_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more conductive additives and/or binder materials. For example, the negative solid-state electroactive particles 50 (and/or third plurality of solid-state electrolyte particles 91) may be optionally intermingled with one or more electrically conductive materials (not shown) that provide an electron conduction path and/or at least one polymeric binder material (not shown) that improves the structural integrity of the negative electrode 22.

For example, the first plurality of negative solid-state electroactive particles 50 (and/or third plurality of solid-state electrolyte particles 91) may be optionally intermingled with binders, such as polyvinylidene difluoride (PVDF), polytetrafluoroethylene (PTFE), ethylene propylene diene monomer (EPDM) rubber, nitrile butadiene rubber (NBR), styrene-butadiene rubber (SBR), polyacrylonitrile (PAN), poly (vinylidene fluoride-co-hexafluoropropylene) (PVDF-HFP) and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive electrode 24 may be formed from a lithium-based or electroactive material that can undergo lithium intercalation and deintercalation while functioning as the positive terminal of the battery 20. For example, in certain variations, the positive electrode 24 may be defined by the second plurality of positive solid-state electroactive particles 62. In certain instances, as illustrated, the positive electrode 24 is a composite comprising a mixture of the second plurality of positive solid-state electroactive particles 62 and the sixth plurality of solid-state electrolyte particles 97. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the second plurality of positive solid-state electroactive particles 62 and greater than or equal to about 0 wt. % to less than or equal to about 50 wt. %, and in certain aspects, optionally greater than or equal to about 5 wt. % to less than or equal to about 20 wt. %, of the sixth plurality of solid-state electrolyte particles 97.

In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may include one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_y$ $Al_{1-x-y}O_2$ (where $0<x\leq1$ and $0<y\leq1$), $LiNi_xMn_{1-x}O_2$ (where $0\leq x\leq1$), and $Li_{1+x}MO_2$ (where $0\leq x\leq1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may include one or more positive electroactive materials selected from the group consisting of $LiCoO_2$, $LiNi_xMn_yCo_{1-x-y}O_2$ (where $0\leq x\leq1$ and $0\leq y\leq1$), $LiNi_xMn_{1-x}O_2$ (where $0\leq x\leq1$), $Li_{1+x}MO_2$ (where $0\leq x\leq1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In certain variations, the positive electrode 24 may further include one or more conductive additives and/or binder materials. For example, the second plurality of positive solid-state electroactive particles 62 (and/or sixth plurality of solid-state electrolyte particles 97) may be optionally intermingled with one or more electrically conductive materials that provide an electron conduction path and/or at least one polymeric binder material (not shown) that improves the structural integrity of the positive electrode 24.

For example, the second plurality of positive solid-state electroactive particles 62 (and/or sixth plurality of solid-state electrolyte particles 97) may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), polyacrylonitrile (PAN), poly(vinylidene fluoride-co-hexafluoropropylene) (PVDF-HFP) and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The bipolar electrode 23 includes a first side (e.g., surface) 25 and a second side (e.g., surface) 27 generally opposite and parallel to the first side 25. The first side 25 includes a plurality of electroactive material particles disposed adjacent to or on a first side 25, for example, on a surface of, the bipolar electrode current collector 33 and the second side 27 includes another plurality of electroactive material particles disposed adjacent to or on a second side 27, for example, on a surface of, the bipolar electrode current collector 33. As illustrated in FIG. 1, the first side 25 may face the negative electrode 22 and/or be disposed proximate to (relative to the second side 27) the negative electrode 22 and the second side 27 may face the positive electrode 24 and/or be disposed proximate to (relative to the first side 25) the positive electrode 24.

In some aspects, the first side 25 of the bipolar current collector 33 may include a lithium-based or electroactive material that can undergo lithium intercalation and deintercalation, as similarly discussed with respect to the positive electrode 24. For example, in certain variations, the first side 25 of the bipolar current collector 33 may be defined by the first plurality of the positive solid-state electroactive particles 60. In certain instances, as illustrated, the first side 25 of the bipolar current collector 33 is a composite comprising a mixture of the first plurality of positive solid-state electroactive particles 60 and the fourth plurality of solid-state electrolyte particles 93. For example, the first side 25 of the bipolar current collector 33 may include greater than or equal to about 30 wt. % to less than or equal to about 98 wt. %, and in certain aspects, optionally greater than or equal to about 50 wt. % to less than or equal to about 95 wt. %, of the first plurality of positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the fourth plurality of solid-state electrolyte particles 93.

In certain variations, the first side 25 of the bipolar current collector 33 may be one of a layered-oxide cathode, a spinel cathode, and a polyanion cathode, for example, as similarly discussed with respect to the positive electrode 24. The first plurality of positive solid-state electroactive particles 60 and the second plurality of positive sold-state electroactive particles 62 may be independently selected. Also, the first side 25 of the bipolar current collector 33 may include additional components, such as those discussed with respect to the positive electrode 24, for example, conductive additives and/or binder materials.

In some aspects, the second side 27 of the bipolar current collector 33 may include may include a lithium host material, similarly discussed with respect to the negative electrode 22. For example, in certain variations, the second side 27 of the bipolar current collector 33 may be defined by the second plurality of negative solid-state electroactive particles 52. In certain instances, the second side 27 of the bipolar current collector 33 is a composite comprising a mixture of the second plurality of negative solid-state electroactive particles 52 and the fifth plurality of solid-state electrolyte particles 95. For example, the second side 27 of the bipolar current collector 33 may include greater than or equal to about 30 wt. % to less than or equal to about 98 wt. %, and in certain aspects, optionally greater than or equal to about 50 wt. % to less than or equal to about 95 wt. %, of the second plurality of negative solid-state electroactive particles 52 and greater than or equal to about 0 wt. % to less than or equal to about 50 wt. %, and in certain aspects, optionally greater than or equal to about 5 wt. % to less than or equal to about 20 wt. %, of the fifth plurality of solid-state electrolyte particles 95.

In certain variations, the second plurality of negative solid-state electroactive particles 52 may include one or more of those materials as similarly discussed with respect to the negative electrode 22. Also, the second side 27 of the bipolar current collector 33 may include additional components, such as those discussed with respect to the negative electrode 22, for example, conductive additives and/or binder materials.

In some variations, the bipolar current collector 33 may have a thickness greater than or equal to about 2 μm to less than or equal to about 60 μm, and in certain aspects, optionally greater than or equal to about 5 μm to less than or equal to about 30 μm. The bipolar current collector 33 may include at least one of stainless steel, aluminum, nickel, iron, titanium, copper, tin, or any other electrically conductive material known to those of skill in the art. In certain variations, the bipolar current collector 33 may be a cladded foil, for example, where one side (e.g., the first side 25 or the second side 27) of the bipolar current collector 33 includes one metal (e.g., first metal) and another side (e.g., the other of the first side 25 or the second side 27) of the bipolar current collector 33 includes another metal (e.g., second metal)) including, for example only, aluminum-copper (Al—Cu), nickel-copper (Ni—Cu), stainless steel-copper (SS-Cu), aluminum-nickel (Al—Ni), aluminum-stainless steel (Al-SS), and nickel-stainless steel(Ni-SS). In certain variations, the bipolar current collector 33 may be pre-coated, such as carbon-coated aluminum current collectors.

In other variations, the bipolar current collector 33 may be configured as a bilayer current collector, for example, including a first current collector and a second current collector. For example, in such variations, the first current collector may define the first side 25 of the bipolar current collector 33 and the second current collector may define the second side 27 of the bipolar current collector 33. The first current collector may be different from the second current collector. In certain variations, the first current collector may function as a positive electrode current collector and the second current collector may function as a negative electrode current collector. In each instance, the first and second current collectors may each include at least one of stainless steel, aluminum, nickel, iron, titanium, copper, tin, or any other electrically conductive material known to those of skill in the art. The first and second current collectors may each have a thickness such that the bipolar current collector 33 has a thickness greater than or equal to about 2 μm to less than or equal to about 60 μm, and in certain aspects, optionally greater than or equal to about 5 μm to less than or equal to about 20 μm.

In some aspects, the negative electrode 22, the bipolar electrode 23, the positive electrode 24, and/or the first and second solid-state electrolyte layers 26, 28 may be characterized with respect to the spaces between various particles of these components. For example, the negative electrode 22, the bipolar electrode 23, the positive electrode 24, and/or the first and second solid-state electrolyte layers 26, 28 may be characterized as having an interparticle space, for example, at interstices between various particles. In various aspects, the interparticle space may be greater than about 0 vol. % to less than or equal to about 60 vol. % of the negative electrode 22, the bipolar electrode 23, the positive electrode 24, and/or the first and second solid-state electrolyte layers 26, 28.

Referring again to FIG. 1, in some aspects, at least a portion of the interparticle space may be filled with a gel 80. For example, the gel 80 may surround the various particles, for example, the first, second, third, fourth, fifth, and/or sixth plurality of solid-state electrolyte particles 90, 92, 91, 93, 95, 97, the first and/or second plurality of negative solid-state electroactive particles 50, 52, and the first and second positive solid-state electroactive particles 60, 62. In various aspects, the gel 80 may fill a portion, substantially all, or all of the interparticle space, for example, at least about 50%, alternatively, at least about 55%, alternatively, at least about 60%, alternatively, at least about 65%, alternatively, at least about 70%, at least about 75%, alternatively, at least about 80%, alternatively, at least about 85%, alternatively, at least about 90%, alternatively, at least about 95%, alternatively, about 100% of the interparticle space may be filled by the gel.

As in the instance of, for example FIG. 1, the gel 80 may be disposed within the interparticle spaces so as to wet interfaces and/or fill void spaces between the first, second, third, fourth, fifth, and/or sixth plurality of solid-state electrolyte particles 90, 92, 91, 93, 95, 97, the first and/or second plurality of negative solid-state electroactive particles 50, 52, and the first and second positive solid-state electroactive particles 60, 62. In some aspects, the space occupied by the gel 80 may include at least a portion of the void spaces between various particles, for example, pores of the negative electrode 22, bipolar electrode 23, and/or positive electrode 24. For example only, the gel 80 may reduce interparticle porosity and improve ionic contact.

For example, in some aspects, the gel 80 may be characterized as exhibiting ionic conductivity. For example, in some aspects, the gel 80 may be characterized as an ion gel (e.g., an ionogel). Not intending to be bound by theory, the gel may be effective to provide a route of ionic movement between adjacent particles (e.g., between two or more the first, second, third, fourth, fifth, and/or sixth plurality of solid-state electrolyte particles 90, 92, 91, 93, 95, 97, the first and/or second plurality of negative solid-state electroactive particles 50, 52, and the first and second positive solid-state electroactive particles 60, 62) and/or between adjacent layers.

In certain variations, the battery 20 (or the first cell 20A and/or the second cell 20B) may include one or more polymer blockers. For example, a polymer blocker may be disposed at or adjacent to a border of a cell unit so as to mitigate a potential ionic short-circuit. For example, one or more polymer blockers may contact or connect one or more current collectors at or adjacent to the border of a cell unit to fully seal the cell unit. Referring again to FIG. 1, a first polymer blocker 70 and a second polymer blocker 72 may be disposed at or towards the respective ends of the first cell 20A, for example, spanning the space between the negative electrode 22 and the bipolar electrode 23. Also, a third polymer blocker 74 and a fourth polymer blocker 76 may be disposed at or towards the respective ends of the second cell 20B, for example, spanning the space between the bipolar electrode 23 and the positive electrode 24. Although FIG. 1 illustrates a polymer blocker pair disposed at the respective ends of both the first cell 20A and the second cell 20B, the skilled artisan will appreciate that in some aspects, a polymer blocker may be applied to only one end of a particular cell, may be absent from a particular cell, or may be entirely absent from the battery.

The polymer blockers 70, 72, 74, and 76 may include an ionic and electronic insulating material. The ionic and/or electronic insulating material may also be characterized as having a strong adhesion force (for example, greater than or equal to about 0.01 MPa to less than or equal to about 1000 MPa, and in certain aspects, optionally greater than or equal to about 0.1 MPa to less than or equal to about 40 MPa). The ionic and/or electronic insulating material may also be characterized as exhibiting excellent thermostability (for example, stability at greater than or equal to about 40° C. to less than or equal to about 200° C., and in certain aspects, optionally greater than or equal to about 45° C. to less than or equal to about 150° C.). For example, one or more of the polymer blockers 70, 72, 74, 76, may include at least one of a hot-melt adhesive (such as urethane resin, polyamide resin, polyolefin resin); a polyethylene resin; a polypropylene resin; a resin containing an amorphous polypropylene resin as a main component and obtained by copolymerizing, for example, ethylene, propylene, and butylene; silicone; a polyimide resin; an epoxy resin; an acrylic resin; a rubber (such as ethylene-propylenediene rubber (EPDM)); an isocyanate adhesive; an acrylic resin adhesive; and a cyanoacrylate adhesive. In various aspects, one or more of the polymer blockers 70, 72, 74, 76 may have a thickness greater than or equal to about 2 µm to less than or equal to about 2000 µm, and in certain aspects, optionally greater than or equal to about 40 µm to less than or equal to about 400 µm.

In various aspects, as illustrated in FIGS. 2-7, a solid-state battery, such as the battery 20 described with respect to FIG. 1, may be formed by way of a method that generally comprises the steps of preparing a free-standing gel, positioning the free-standing gel between two adjacent layers for each cell, stacking two or more cells, infiltrating the gel of the free-standing gel into one or more pores or spaces of the stacked layers.

In some aspects, preparing the free-standing gel may include preparing a gel precursor solution. The gel precursor solution may generally include a polymer, a solvent, a lithium salt, and, optionally, a one or more functional additives. In various aspects, the polymer may be present in the gel precursor solution at a rate from about 5% by weight of the gel precursor solution to about 60% by weight of the gel precursor solution; the solvent may be present in the gel precursor solution at a rate from about 10% by weight of the gel precursor solution to about 80% by weight of the gel precursor solution; and the lithium salt may be present in the gel precursor solution at a rate from about 0.01 mol/L of the gel precursor solution to about 3 mol/L of the gel precursor solution. When present, the functional additive may be present at a rate from about 0.01% by weight of the gel precursor solution to about 10% by weight of the gel precursor solution.

In various aspects, the polymer may include one or more organic polymers having a suitable number of repeating subunits. For example number of repeating subunits may range, in various aspects, from about 1,000 to about 10,000,000. The one or more organic polymers may include, for example only, a nitrile-based solid polymer electrolyte, such as a poly(acrylonitrile) (PAN); a polyether, such as poly (ethylene oxide) (PEO) or poly(ethylene glycol); a polyester-based solid polymer, such as polyethylene carbonate (PEC), poly(trimethylene carbonate) (PTMC), or poly (propylene carbonate) (PPC); a polyvinylidene difluorides (PVDF); a poly(vinylidene fluoride-co-hexafluoropropylene) (PVDF-HFP) and combinations and/or composites thereof.

The solvent, in some aspects, may be a low-boiling-point solvent and may be selected to dissolve the polymer. The solvent may include, for example only, at least one of dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols such as isopropyl alcohol and butanol, and combinations thereof.

The lithium salt may include a lithium cation and a suitable anion. For example, lithium salt may include one or more of lithium bis-trifluoromethanesulfonimide (LiTFSI), lithium tetrafluoroborate (LiBF$_4$), lithium bis(oxalate)borate (LiBOB), lithium difluoro(oxalato) borate (LiODFB), lithium difluorophosphate (LiPO$_2$F$_2$), lithium fluoride (LiF) or the combinations thereof.

In various aspects, the functional additive may be present to modify or improve one or more characteristics of the gel precursor solution and/or the free-standing gel. Examples of functional additives may include 1,3,2-Dioxathiolane 2,2-dioxide (DTD), vinyl ethylene carbonate (VEC), vinylene carbonate (VC), fluorosulfonyl isocyanate (FI), trimethyl borate (TMB), tris(trimethylsilyl) phosphite (TTSPi), methylene methane disulfonate (MMDS), prop-1-ene-1,3-sultone (PES), and combinations thereof.

The polymer, solvent, and lithium salt may be mixed under suitable conditions to form the gel precursor solution. For example, the polymer and solvent may be mixed at a temperature, for example, at least 60° C., or from about 60° C. to about 200° C., for example, as necessary for the gel precursor to be substantially or fully melted.

In some aspects, preparing the free-standing gel may also include casing (e.g., hot-casting) the gel precursor solution to form the free-standing gel. For example, in some aspects, the heated, melted (for example, flowable and/or liquid) gel precursor solution may be hot-cast and allowed to cool to form the free-standing gel. In various aspects, the gel precursor solution may be cast so as to form the free-standing gel so as to have the desired dimensions. For example, in some aspects, the free-standing gel may have a thickness ranging from 1 µm to about 200 µm.

Figure 2:
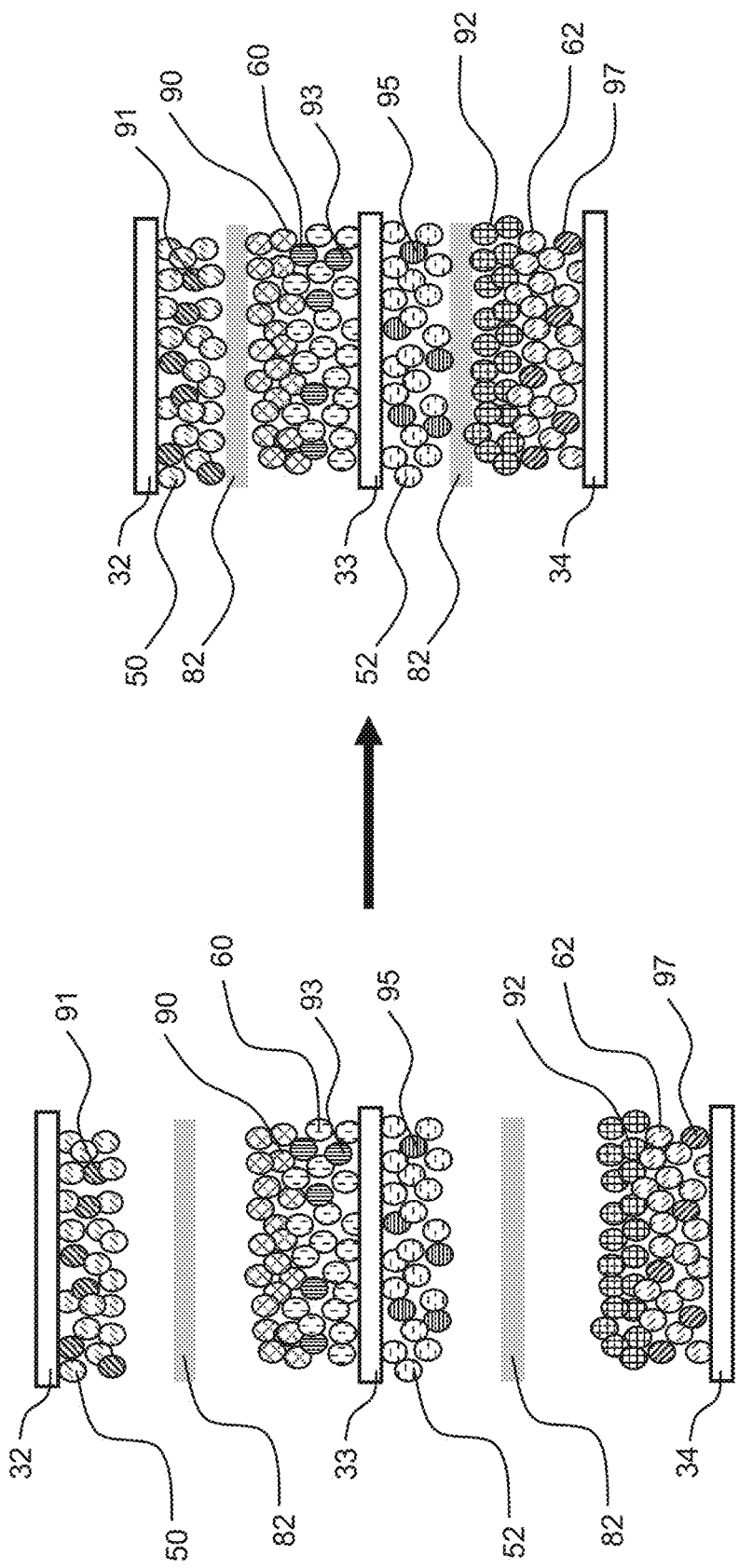
FIG. 2 is an illustration of an example of one or more steps in a method for forming a solid-state battery in accordance with various aspects of the current technology.

Referring to FIG. 2, an example of the step of positioning the free-standing gel between two adjacent layers of a cell is shown. In some aspects, after the free-standing gel has been formed, the free-standing gel may be positioned between two adjacent layers of the cell (for example, the first cell 20A and the second cell 20B), for example, between two electrodes (e.g., between a first and second electrode, between a second and third electrode, between a third and fourth electrode, or the like). One or both of the two electrodes may have a layer of solid electrolyte disposed on the electrode. For example, in the example illustrated in FIG. 2, two free-standing gels 82 are shown positioned between the first plurality of negative solid-state electroactive particles 50 (together with the third plurality of solid-state electrolyte particles 91) and the first plurality of solid-state electrolyte particles 90 and, also, between the second plurality of negative solid-state electroactive particles 52 (together with the fifth plurality of solid-state electrolyte particles 95) and the second plurality of solid-state electrolyte 92. Each electrode defines a plurality of pores or open spaces between respective particles. Additionally or alternatively, in some aspects a free-standing gel may be positioned between the first plurality of solid-state electrolyte particles 90 and the first plurality of positive solid-state electroactive particles 60 (together with the fourth plurality of solid-state electrolyte particles 93) and/or between and the second plurality of solid-state electrolyte 92 and the second plurality of positive solid-state electroactive particles 62 (together with the sixth plurality of solid-state electrolyte particles 95).

As also shown in FIG. 2, with the various layers positioned with respect to each other, the layers can be stacked. For example, the negative electrode 22 may be disposed adjacent to the first side (FIG. 1, 25) of the bipolar electrode 23 and the positive electrode 24 may be disposed adjacent to second side (FIG. 1, 27) of the bipolar electrode, with free-standing gels 82 between, respectively. While FIG. 2 illustrates the various layers of the first cell 20A and the second cell 20B being positioned (e.g., stacked) together substantially contemporaneously, upon viewing this disclosure the skilled artisan will appreciate that, in various aspects, two or more layers may be stacked together (e.g., preassembled) prior to stacking with another layer or combination of layers.

Figure 3:
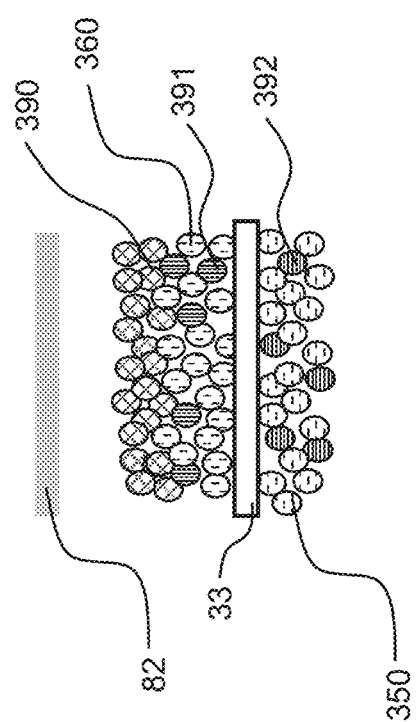
FIG. 3 is an illustration of an example of one or more steps in a method for forming a solid-state battery in accordance with various aspects of the current technology.

For example, referring to FIG. 3, in some aspects the free-standing gel 82 may be positioned with respect to (e.g., preassembled with) a bipolar electrode current collector 33 having a cathode side and an anode side. In the example of FIG. 3, the cathode side includes a first plurality of solid-state electrolyte particles 390 and a plurality of positive solid-state electroactive particles 360 together with a second plurality of solid-state electrolyte particles 391. Likewise, the anode side includes a plurality of negative solid-state electroactive particles 350 together with a third plurality of solid-state electrolyte particles 392. As illustrated, the free-standing gel 82 may be positioned with respect to the cathode side and, then, multiple preassembled units including the bipolar electrode current collector 33 and the free-standing gel 82 can be stacked to obtain a desired number of bipolar cells. In some aspects, for example, the bipolar electrode (e.g., the preassembled layers) may be stacked together in a number from about 2 to about 100.

Figure 4:
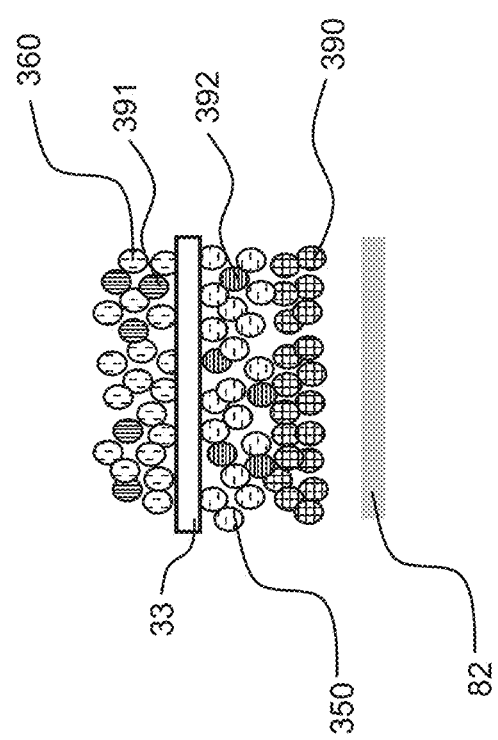
FIG. 4 is an illustration of an example of one or more steps in a method for forming a solid-state battery in accordance with various aspects of the current technology.

Referring to FIG. 4, in another example, the anode side includes the first plurality of solid-state electrolyte particles 390 and the plurality of negative solid-state electroactive particles 350 together with the third plurality of solid-state electrolyte particles 392. Likewise, the cathode side includes a plurality of positive solid-state electroactive particles 360 together with a second plurality of solid-state electrolyte particles 391. As illustrated, the free-standing gel 82 may be positioned with respect to the anode side and, then, multiple preassembled units including the bipolar electrode current collector 33 and the free-standing gel 82 can be stacked to obtain a desired number of bipolar cells. In some aspects, for example, the bipolar electrode (e.g., the preassembled layers) may be stacked together in a number from about 2 to about 100.

Figure 5:
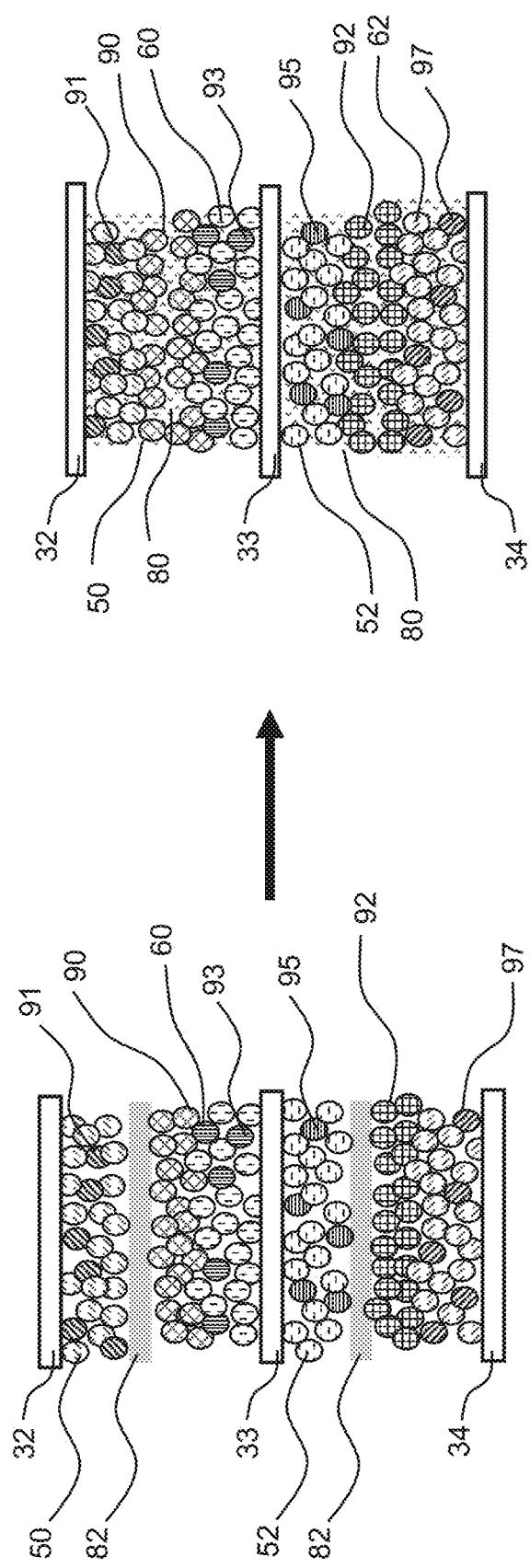
FIG. 5 is an illustration of an example of one or more steps in a method for forming a solid-state battery in accordance with various aspects of the current technology.

Referring to FIG. 5, an example of the step of infiltrating the free-standing gel into open spaces or pores of the stacked layers is shown. In some aspects, the step of infiltrating the free-standing gel 82 into the various layers may comprise heating the free-standing gel 82 (and/or one or more other layers), for example, to a temperature sufficient to allow the free-standing gel 82 to be substantially or fully melted, for example, from about 60° C. to about 200° C., or at least 60° C., or at least 70° C., or at least 80° C., or at least 90° C., or at least 100° C., or at least 110° C., or at least 120° C., or at least 130° C., or at least 140° C., or at least 150° C., or at least 160° C., or at least 170° C., or at least 180° C. In some aspects, when heated, the free-standing gel 82 may become flowable, for example, such that the gel forming the free-standing gel 82 can move into the spaces between the various particles, for example, to form the gel 80.

Additionally or alternatively, in some aspects, the step of infiltrating the free-standing gel 82 into the various layers may comprise applying pressure to the stacked layers. Not intending to be bound by theory, the application of pressure to the stacked layers may be effective to cause the free-standing gel to move into the open pores or spaces between the various particles. For example, the application of pressure may be effective to ensure intimate contact between the various layers. For example, in some aspects, a pressure of from 0.1 MPa to about 200 MPa may be applied to press the components together.

As shown in FIG. 5, and as also discussed with respect to FIG. 1, the gel 80 may fully or substantially fill the spaces between the particles and/or fully or substantially surround the various particles present within each of the cells (e.g., the first cell 20A and the second cell 20B). In various aspects, the free-standing gel 82 may be sized so as to substantially or entirely fill the free-space between the particles. For example, in some aspects, the free-standing gel 82 may have a volume that is about 95% of the volume of the free-space between particles, or about 96%, or about 97%, or about 98%, or about 99%, or about 100%, or about 101%, or about 102%, or about 103%, or about 104%, or about 105% of the volume of the free-space between particles. For example, in some aspects, the free-standing gel 82 may be fully infiltrated into the free-space between particles. Alternatively, in some aspects, a portion of the free-standing gel 82 may remain (e.g., as a layer), for example, where the free-standing gel 82 has a volume greater than the combined volume of the spaces between the particles.

In some aspects, the method of forming a bipolar battery, as discussed herein, may include one or more additional, post-processing steps. For example, the electrodes and/or cells formed according to these methods may be subjected to additional processing to progress the electrodes and/or cells toward an intermediate product or the end-product, for example, the battery 20 discussed with respect to FIG. 1.

Figure 6:
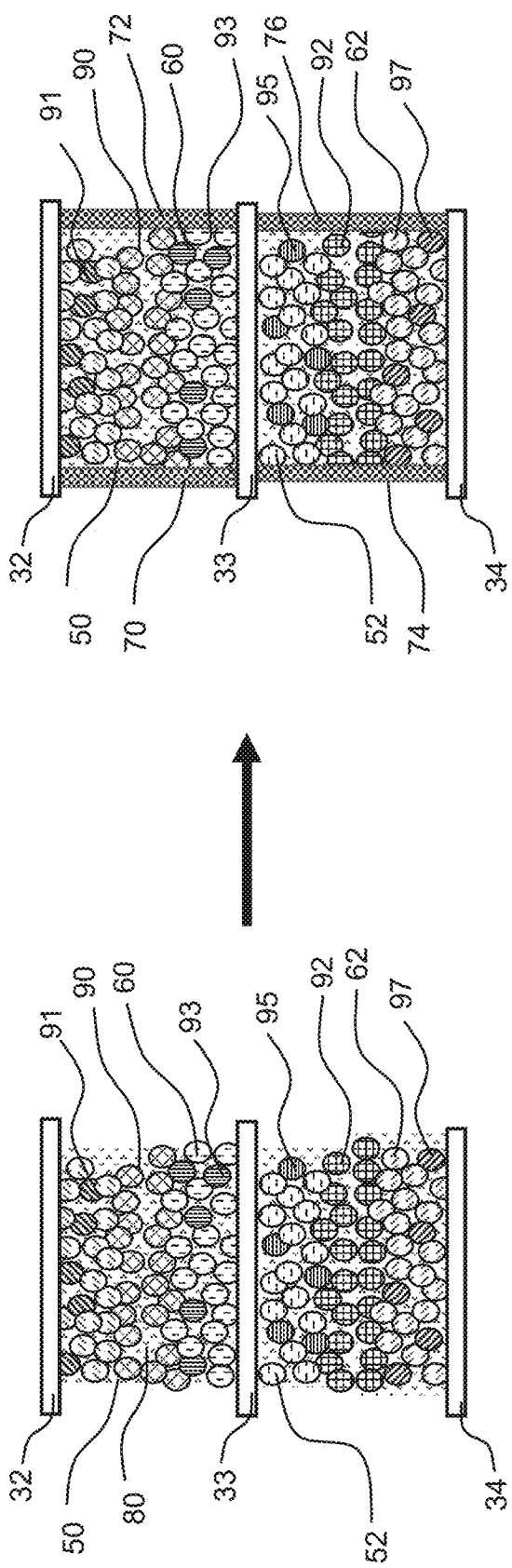
FIG. 6 is an illustration of an example of one or more steps in a method for forming a solid-state battery in accordance with various aspects of the current technology.

For example, referring to FIG. 6, in some aspects, a polymer blocker may be applied to one or more borders of a cell. For example, the first, second, third, and fourth polymer blockers 70, 72, 74, 76, as discussed with respect to FIG. 1, may be applied to one or more borders of an electrode. For example, as shown in FIG. 6, the first polymer blocker 70 and second polymer blocker 72 may be applied to the borders of the bipolar electrode (FIG. 1, 23) and the third polymer blocker 74 and fourth polymer blocker 76 may be applied to the positive electrode (FIG. 1, 24). In other aspects, a portion of a polymer blocker may be applied to multiple electrodes or no polymer blocker may be applied.

In some aspects, the polymer blocker(s) may have a dimension that is at least 100% of the combined thickness of the electrodes to which the polymer blocker is applied and not more than 120% of the combined thickness of the electrodes to which the polymer blocker is applied. In some aspects, the polymer blocker may be applied in a non-solid form, for example, such that the polymer blocker is malleable, pliable, or flexible. In some aspects, with the polymer blockers disposed in place, the polymer blockers may be solidified, such as by exposing the polymer blockers to a heat source. For example, the polymer blockers may be solidified by exposure to temperatures of at least about 60° C., or at least about 100° C., or about 120° C.

Although the example of FIG. 6 illustrates the polymer blocker being applied to the cells after assembly of the layers and infiltration of the free-stranding gel 82 to form the gel 80, in other aspects, polymer blockers may be applied at any suitable stage during manufacture. For example, in some aspects, the polymer blocker(s) may be applied prior to infiltration of the free-standing gel 82. Not intending to be bound by theory, application of the polymer blockers prior to filtration of the free-stranding gel 82 may be effective to prevent a portion of the gel from escaping (e.g., seeping out of the cell(s)).

Figure 7:
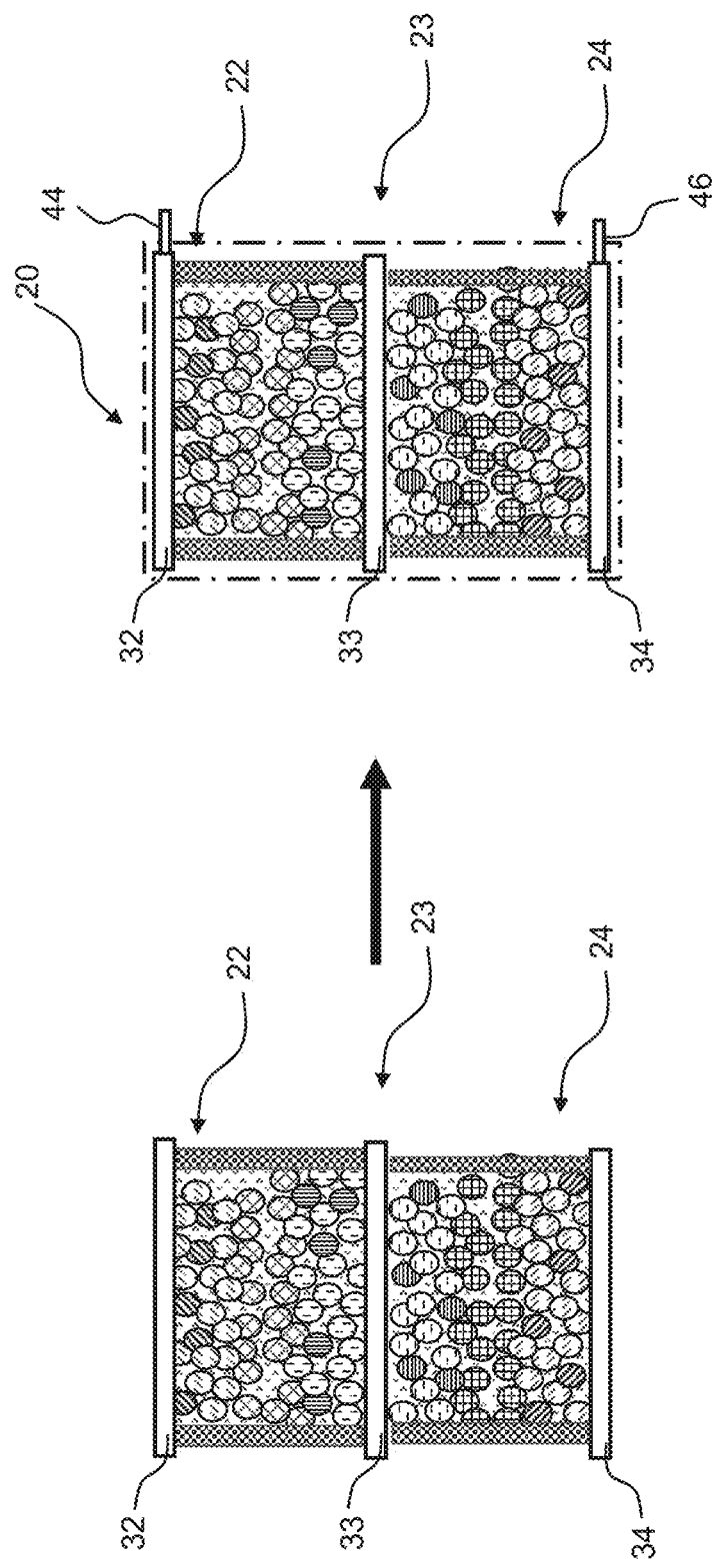
FIG. 7 is an illustration of an example of one or more steps in a method for forming a solid-state battery in accordance with various aspects of the current technology.

Additionally, referring to FIG. 7, in some aspects one or more tabs may be attached to one or more of the electrodes. For example, a negative tab 44 may be attached (e.g., welded) to the negative electrode current collector 32 and a positive tab 46 may be attached (e.g., welded) to the positive electrode current collector 34. Also, in some aspects, the cells may be sealed, such as by placement within an aluminum-laminated bag or container and/or by vacuum-sealing.

In some aspects, a plurality of cells formed according to the present methods may be assembled to form a series-connected elementary cell core (SECC-2, $V_2$, $C_2$) via series connection of the electrodes. For example, the series-connected elementary cell core may have a series connection number from 1 to about 100. In some aspects, a solid-state battery with both high voltage and high capacity was fabricated via a parallel connection of the SECCs. For example, the solid-state battery may have a parallel connection number from 1 to about 100.

Additionally or alternatively, in some aspects, a plurality of cells formed according to the present methods may be assembled to form a parallel-connected elementary cell core (PECC-1, $V_1$, $C_1$) via parallel connection of the electrodes. For example, parallel-connected elementary cell core may have a parallel connection number from 1 to about 100. In some aspects, a solid-state battery with both high voltage and high capacity was fabricated via a series connection of PECCs. For example, the solid-state battery may have a series connection number from 1 to about 100.

In some aspects, the method discussed with respect to FIGS. 2-7 may yield a battery exhibiting good contact between the various pluralities of solid-state electroactive particles and the pluralities of solid-state electrolyte particles. For example, such as illustrated in FIG. 1, the method yields a gel 80, formed in situ, that may be disposed within the battery 20 so as to fill void spaces and wet interfaces between the solid-state electrolyte particles and/or the solid-state active material particles which may, for example only, reduce interparticle porosity and/or enable higher thermal stability.

Additionally, and also for example, the gel 80 may be effective to improve ionic and/or physical contact between cell components on both a micro-interface scale and a macro-interface scale. For instance, the gel 80 may improve contact at a micro-interface scale by improving point-to-point contact between adjacent or proximate particles, and at a macro-interface scale by improving contact between adjacent layers.

A battery, such the battery 20 discussed with respect to FIGS. 1-7, may also exhibit excellent performance characteristics. Not intending to be bound by theory, by improving contact at a micro-interface scale (e.g., by improving point-to-point contact between adjacent or proximate particles) and at a macro-interface scale (by improving contact between adjacent layers) batteries formed according to the methods disclosed herein may overcome electrochemical deficiencies attributable poor interfacial contact.

Referring to the data illustrated graphically in FIGS. 8, 9, 10, and 11, a battery formed according to the process discussed with respect to FIGS. 2-7 can endow the battery with an excellent performance properties. The bipolar battery to which this data pertains includes two cells connected in series having a cathode including $LiMn_2O_4$(LMO)/$Li_{1.3}Al_{0.3}Ti_{1.7}(PO_4)_3$(LATP)/SUPER-P (SP)/graphite (KS6)/polyvinylidene difluoride (PVDF) in a ratio of 83:10:3:1:3; and anode including $Li_4Ti_5O_{12}$ (LTO)/$Li_7La_3Zr_2O_{12}$ (LLZO)/SUPER-P (SP)/graphite (KS6)/polyvinylidene difluoride (PVDF) in a ratio of 81:10:3:1:5; a solid electrolyte layer including LATP/polyvinylidene difluoride (PVDF) in a ratio of 95:5; and a gel including a PAN polymer in ethylene carbonate (EC)/gamma-butyrolactone (GBL) with 0.4M trifluoromethanesulfonimide (LiTFSI) and 0.4M lithium tetrafluoroborate ($LiBF_4$). The as-prepared bipolar batteries were tested in pouch cells at 25° C.

Figure 8:
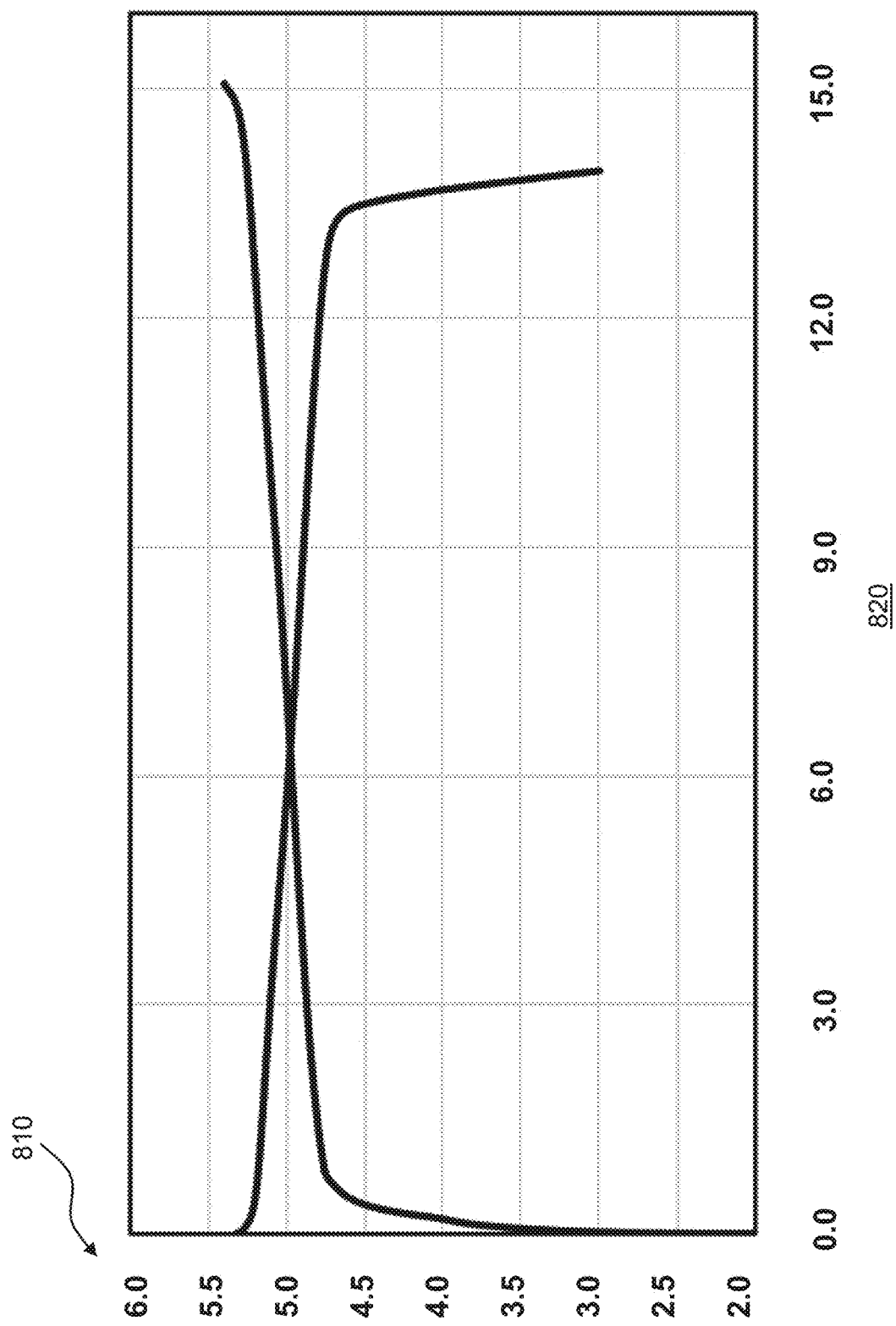
FIG. 8 is a graphical illustration of data for a solid-state battery formed in accordance with various aspects of the current technology.
Figure 9:
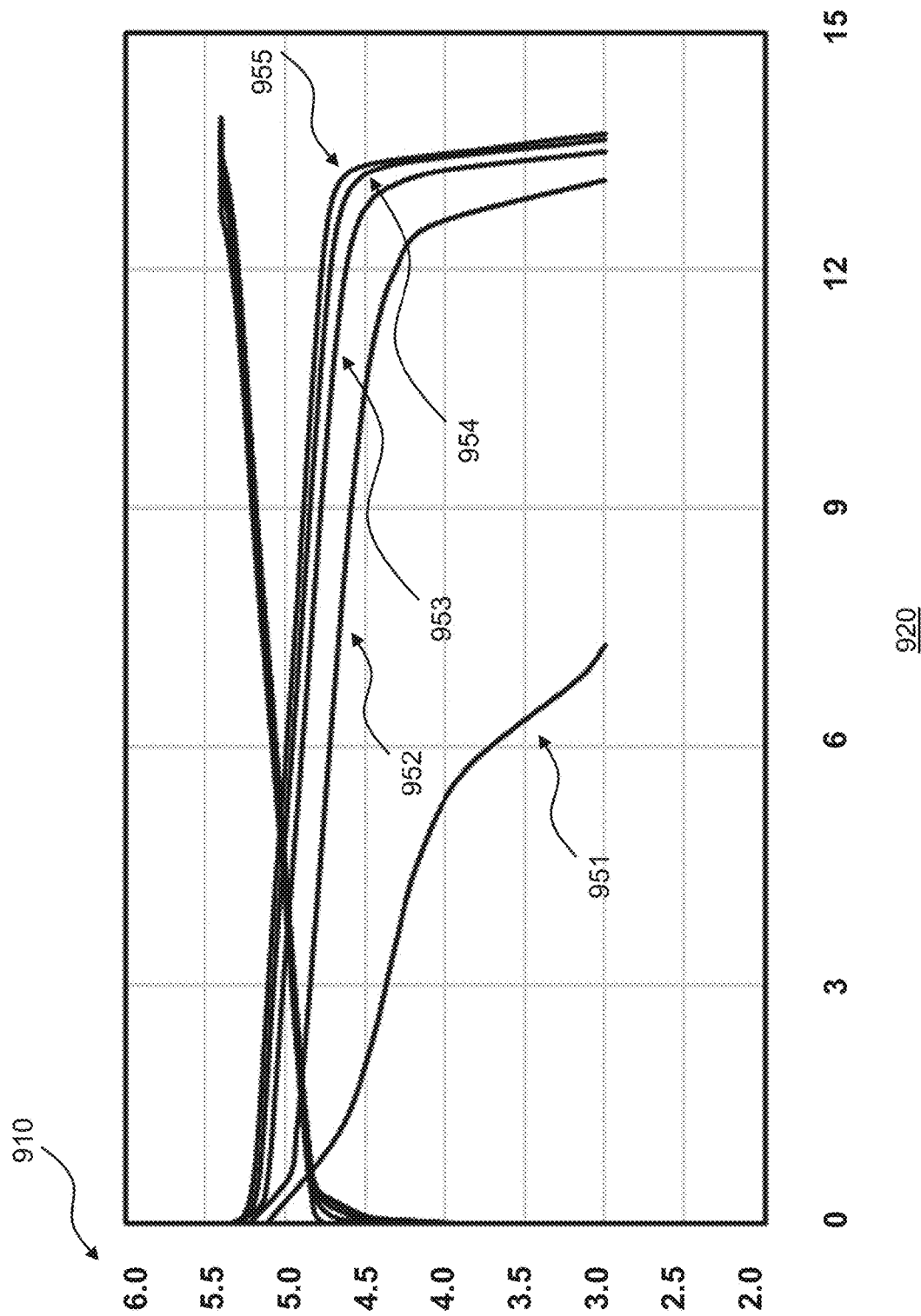
FIG. 9 is a graphical illustration of data for a solid-state battery formed in accordance with various aspects of the current technology.
Figure 10:
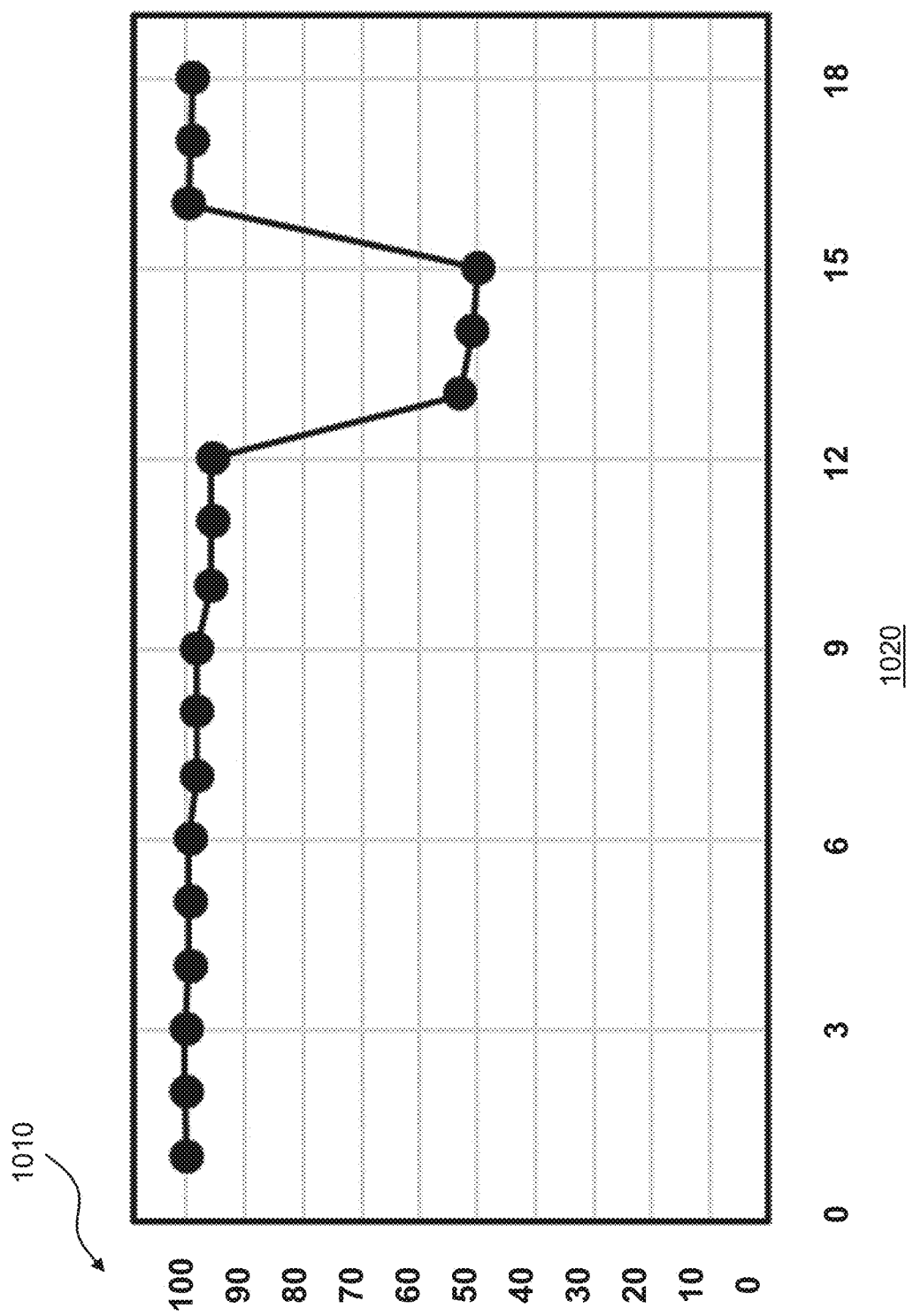
FIG. 10 is a graphical illustration of data for a solid-state battery formed in accordance with various aspects of the current technology.
Figure 11:
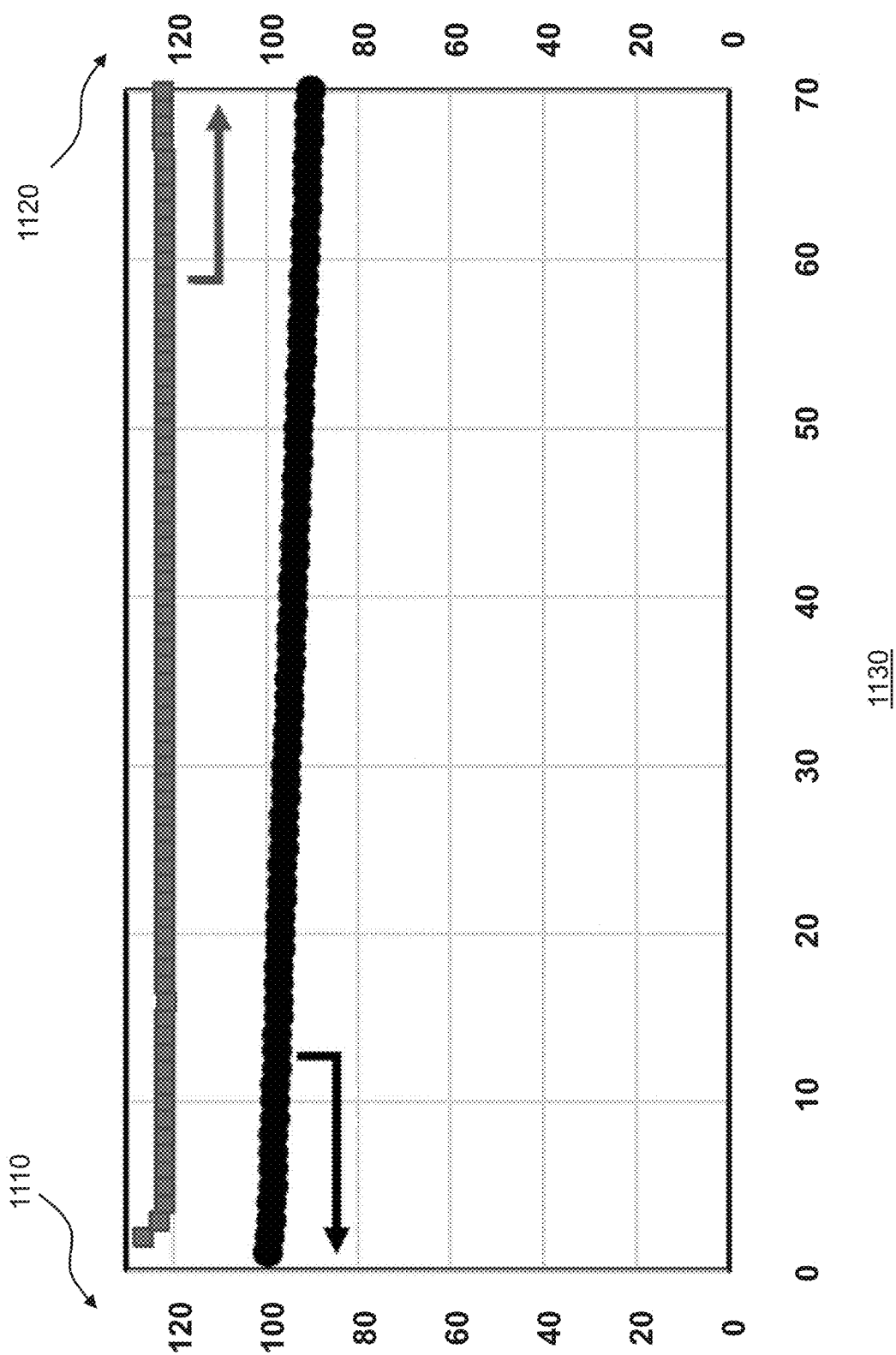
FIG. 11 is a graphical illustration of data for a solid-state battery formed in accordance with various aspects of the current technology.

FIG. 8 illustrates voltage 810 (V) with respect to capacity 820 (mAh) for a first cycle charge/discharge for the battery. The discharge plateau of the 2 cells in series and 1 cell in parallel (2s1p) bipolar battery is about 5V, which is about double of that of the unit cells, demonstrating a successful proof-of-concept of the 2s1p bipolar battery. As shown in FIG. 8, the battery demonstrates a cycle efficiency (CE), for the first cycle, of about 92%. FIG. 9 illustrates voltage 810 (V) with respect to capacity 820 (mAh) for the charge/discharge curves of the bipolar cell under varying C-rate, specifically, 10C (951), 5C (952), 2C (953), 1C (954), and 0.5C (955). The batteries show very little difference in discharge capacity from 0.5 to 5C. FIG. 10 illustrates rate performance for the battery as the capacity retention 1010 (%) with respect to cycle number 1020 of the battery. As shown in FIG. 10, the battery demonstrates a 10C/1C capacity retention of about 50%, demonstrating an excellent power capability of the bipolar cell. FIG. 11 illustrates each of capacity retention 1110(%) and efficiency 1120(%) with respect to cycle number 1130 for a 1C charge/discharge for the battery. As shown in FIG. 11, the battery demonstrates a good cycling stability with more than 90% capacity retention after 70 cycles.

Additionally, the methods of preparing a battery as discussed with respect to FIGS. 2-7, particularly, the use of a free-standing gel to prepare the battery, may be advantageous in that application of the gel in the free-standing form does not require the use of excessive solvents. Also, the free-standing gel may be easily tuned to a desired thickness, for example, to allow for a desired volume of gel to be infiltrated into interparticle spaces. Also the free-standing gel is flexible and is suitable for roll-to-roll application processes/techniques, making the process fast and efficient.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a bipolar solid-state battery, the method comprising:

positioning a first freestanding gel between a first electrode and a second electrode and a second freestanding gel between the second electrode and a third electrode, wherein the first freestanding gel and the second freestanding gel each comprises a polymer, a solvent, and a lithium salt, wherein each of the first electrode, the second electrode, and the third electrode comprises a plurality of electroactive particles, wherein a first solid electrolyte layer comprising a first plurality of solid electrolyte particles is disposed on the first electrode or on a first side of the second electrode, and wherein a second solid electrolyte layer comprising a second plurality of solid electrolyte particles is disposed on a second side of the second electrode or on the third electrode; and infiltrating at least a portion of the first free-standing gel into a space between particles of the first electrode and the second electrode and at least a portion of the second free-standing gel into a space between the particles of second electrode and the third electrode.

2. The method of claim 1, wherein the polymer comprises a nitrile-based solid polymer electrolyte, a polyether, a polyester-based solid polymer, a polyvinylidene difluoride, a poly (vinylidene fluoride-co-hexafluoropropylene, and combinations and/or composites thereof.

3. The method of claim 1, wherein the solvent comprises ethylene carbonate, propylene carbonate, gama-butyrolactone, tetraethyl phosphate, fluoroethylene carbonate, diethyl carbonate, ethyl methyl carbonate, ethylene sulfate, tetrahydrofuran or combinations thereof.

4. The method of claim 1, wherein the lithium salt comprises lithium bis-trifluoromethanesulfonimide (LiTFSI), lithium tetrafluoroborate (LiBF$_4$), lithium bis(oxalate) borate (LiBOB), lithium difluoro (oxalato) borate (LiODFB), lithium difluorophosphate (LiPO$_2$F$_2$), lithium fluoride (LiF) or the combinations of the mentioned salts.

5. The method of claim 1, wherein the first electrode comprises a third plurality of solid electrolyte particles mixed with the plurality of electroactive particles at the first electrode, the second electrode comprises a fourth plurality of solid electrolyte particles mixed with the plurality of electroactive particles at the second electrode, and the third electrode comprises a fifth plurality of solid electrolyte particles mixed with the plurality of electroactive particles at the third electrode.

6. The method of claim 5, wherein one or more of the first, second, third, fourth, or fifth plurality of solid electrolyte particles comprises an oxide-based particle, a metal-doped or aliovalent-substituted oxide particle, a sulfide-based particle, a nitride-based particle, a hydride-based particle, a halide-based particle, a borate-based particle, an inactive oxide, or combinations thereof.

7. The method of claim 1, wherein the first electrode comprises a negative electrode having a first plurality of negative electroactive particles.

8. The method of claim 7, wherein the second electrode comprises a bipolar electrode, the first side having a first plurality of positive electroactive particles, and the second side having a second plurality of negative electroactive particles.

9. The method of claim 8, wherein the third electrode comprises a positive electrode having a second plurality of positive electroactive particles.

10. The method of claim 1, wherein the first solid electrolyte layer is disposed on the first electrode, and wherein the first free-standing gel is positioned between the first solid electrolyte layer and the second electrode.

11. The method of claim 1, wherein the first solid electrolyte layer is disposed on the first side of the second electrode, and wherein the first free-standing gel is positioned between the first solid electrolyte layer and the first electrode.

12. The method of claim 1, wherein the infiltrating at least a portion of the first free-standing gel and the second free-standing gel comprises heating the first free-standing gel and the second free-standing gel to a temperature of greater than or equal to about 40° C. to less than or equal to about 200° C.

13. The method of claim 12, wherein the infiltrating at least a portion of the first free-standing gel and the second free-standing gel further comprises applying pressure to press the first electrode, the second electrode, and the third electrode together.

14. The method of claim 13, wherein the pressure is from about 0.1 MPa to about 200 MPa.

15. The method of claim 1, wherein the infiltrating at least a portion of the first free-standing gel and the second free-standing gel yields a gel disposed in the space between particles of the first electrode, the second electrode, and the third electrode.

16. The method of claim 15, wherein the gel exhibits ionic conductivity.

17. The method of claim 1, wherein the first free-standing gel, the second free-standing gel, or both have a thickness from 1 μm to about 200 μm.

18. A method for forming a bipolar solid-state battery, the method comprising:
preparing a plurality of freestanding gels each comprising a polymer, a solvent, and a lithium salt by mixing them together to form a gel precursor solution, melting the gel precursor solution, and casting the gel precursor solution;
positioning a first freestanding gel between a first electrode and a second electrode and a second freestanding gel between the second electrode and a third electrode, wherein the first freestanding gel and the second free-standing gel each comprises a polymer, a solvent, and a lithium salt,
wherein each of the first electrode, the second electrode, and the third electrode comprises a plurality of electroactive particles,
wherein a first solid electrolyte layer comprising a first plurality of solid electrolyte particles is disposed on the first electrode or on a first side of the second electrode, and
wherein a second solid electrolyte layer comprising a second plurality of solid electrolyte particles is disposed on a second side of the second electrode or on the third electrode; and
infiltrating at least a portion of the first free-standing gel into a space between particles of the first electrode and the second electrode and at least a portion of the second free-standing gel into a space between the particles of second electrode and the third electrode.

19. The method of claim 18, further comprising applying a polymer blocker to one or more of borders of the first electrode, the second electrode, or the third electrode, wherein the polymer blocker comprises a hot-melt adhesive, a polyethylene resin, a polypropylene resin, a resin containing an amorphous polypropylene resin as a main component and obtained by copolymerization with ethylene, propylene, and butylene, a silicone, a polyimide resin, an epoxy resin, an acrylic resin, a rubber, an isocyanate adhesive, an acrylic resin adhesive, a cyanoacrylate adhesive, or combinations thereof.

* * * * *